US007012852B2

(12) United States Patent
West et al.

(10) Patent No.: US 7,012,852 B2
(45) Date of Patent: Mar. 14, 2006

(54) METHOD, APPARATUS AND SYSTEM FOR DETECTING SEISMIC WAVES IN A BOREHOLE

(75) Inventors: Phillip B. West, Idaho Falls, ID (US); Roger L. Sumstine, St. George, UT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 10/423,758

(22) Filed: Apr. 23, 2003

(65) Prior Publication Data

US 2004/0113627 A1 Jun. 17, 2004

Related U.S. Application Data

(63) Continuation-in-part of application No. 10/322,259, filed on Dec. 17, 2002, now abandoned.

(51) Int. Cl.
*G01V 1/40* (2006.01)
*E21B 49/00* (2006.01)

(52) U.S. Cl. .................. 367/25; 181/102; 181/105; 166/250.16

(58) Field of Classification Search .................. 367/57, 367/173, 182–187, 912, 25; 175/40, 50; 166/254.2, 250.17, 250.16; 310/349, 351; 181/122, 208, 102, 104, 105, 108
See application file for complete search history.

(56) References Cited

U.S. PATENT DOCUMENTS

| 4,292,589 A | * | 9/1981 | Bonner ...................... 324/221 |
| 4,538,203 A | * | 8/1985 | Flanner et al. .............. 361/159 |
| 4,808,625 A | * | 2/1989 | Baird .......................... 514/654 |
| 4,808,925 A |   | 2/1989 | Baird |
| 5,131,477 A | * | 7/1992 | Stagg et al. .................. 175/40 |
| 5,694,375 A | * | 12/1997 | Woodall ...................... 367/185 |
| 5,864,099 A | * | 1/1999 | Wittrisch et al. ........... 181/102 |
| 5,963,508 A | * | 10/1999 | Withers ....................... 367/38 |
| 6,018,301 A | * | 1/2000 | Smith ....................... 340/854.4 |
| 6,112,808 A | * | 9/2000 | Isted ............................ 166/60 |
| 2002/0145423 A1 | * | 10/2002 | Yoo ........................... 324/221 |
| 2004/0040715 A1 | * | 3/2004 | Wellington et al. ......... 166/302 |

* cited by examiner

*Primary Examiner*—Ian J. Lobo
(74) *Attorney, Agent, or Firm*—Trask Britt, P.C.

(57) ABSTRACT

A method, apparatus and system for detecting seismic waves. A sensing apparatus is deployed within a bore hole and may include a source magnet for inducing a magnetic field within a casing of the borehole. An electrical coil is disposed within the magnetic field to sense a change in the magnetic field due to a displacement of the casing. The electrical coil is configured to remain substantially stationary relative to the well bore and its casing along a specified axis such that displacement of the casing induces a change within the magnetic field which may then be sensed by the electrical coil. Additional electrical coils may be similarly utilized to detect changes in the same or other associated magnetic fields along other specified axes. The additional sensor coils may be oriented substantially orthogonally relative to one another so as to detect seismic waves along multiple orthogonal axes in three dimensional space.

37 Claims, 7 Drawing Sheets

METHOD, APPARATUS AND SYSTEM FOR DETECTING SEISMIC WAVES IN A BOREHOLE

RELATED APPLICATION DATA

The present application is a continuation in part of U.S. patent application Ser. No. 10/322,259, filed on Dec. 17, 2002 now abandoned.

GOVERNMENT RIGHTS

The United States Government has certain rights in this invention pursuant to Contract No. DE-AC07-99ID13727, and Contract No. DE-AC07-05ID14517 between the United States Department of Energy and Battelle Energy Alliance LLC.

BACKGROUND OF THE INVENTION

1. Field of the Invention

The present invention relates generally to seismic exploration and, more specifically, to a method, apparatus and system for use in detecting waves in an encased borehole.

2. State of the Art

Seismic surveying is used to examine subterranean geological formations for the potential presence of hydrocarbons such as oil, natural gas and combinations thereof as well as the extent or volume of such reserves. Seismic waves are emitted from a seismic source to penetrate through layers of rock and earth, and under certain conditions the waves are reflected and refracted by variations in the composition of the subterranean formations. Seismic sensors, such as, for example, geophones, may be positioned at various locations to receive the reflected and refracted sound or acoustic waves and convert them into corresponding electrical signals. The signals produced by such seismic sensors are then analyzed for the presence and extent of formations containing oil and gas deposits.

Geophone-type sensors conventionally include a spring mounted electrical coil which is positioned within the field of a permanent magnet. The geophone is conventionally clamped, or otherwise fixed, to a solid structure which transmits seismic waves to the geophone. For example, geophones may be staked to the surface of a terrain which is being surveyed. Seismic waves may then be transmitted from a seismic source, through the various subterranean features which then reflect and refract the waves, which then travel through the stakes, and into permanent magnet of the geophones. The permanent magnet is displaced and may oscillates while the electrical coil floats in a given axis relative to the permanent magnet, and thus relative to the magnetic field, thereby inducing an electrical change through the coils responsive to the relative displacement between the magnet and coils. This electrical change is recorded as a signal representative of the seismic waves.

It is noted that geophone-type sensors are conventionally one-dimensional detecting and recording devices. This is a result of the geophone's basic design, wherein the coil is displaced along a defined axis relative to the permanent magnet. Thus, in order to properly detect and record seismic activity within a given formation, multiple geophone sensors, oriented at orthogonal axes relative to one another, may be employed. Indeed, geophones, or geophone modules, may include three separate sensors, with the sensors being respectively oriented, for example, in along the X, Y and Z axes of a Cartesian coordinate system.

More recently, geophones have been employed in downhole environments in an effort to improve the accuracy of seismic surveys. However, in doing so, such geophones still have to be clamped to a fixed structure, such as, for example, by pressing the geophone firmly against the side wall of the well bore, in order to detect any seismic waves which may be transmitted therethrough. The use of clamping mechanisms requires that additional components to be deployed downhole, additional controls be implemented within a given surveying system and generally increases the complexity of a given surveying operation. Furthermore, geophones are often arranged as strings or other longitudinally extending structures where multiple geophones are spaced apart significant distances in order to obtain seismic data at multiple locations within a well bore. The length of such assemblies presents additional complexity in clamping the geophones within the well bore, as clamping must occur at multiple locations along the assembly.

Additionally, even with adequate clamping mechanisms, it can be difficult to effectively couple the geophone with a specified fixed structure, such as the side wall of a well bore, in a downhole environment. For example, often times there is a coating of built-up drilling fluid or "mud" or other material on the surface of a well bore wall. Thus, in such cases the "clamping" of the geophone is with the built-up layer of material which does not effectively transfer seismic waves present in the surrounding formation. Instead, the "clamping" of a geophone with the built-up layer of material may in fact lead to the detection of seismic data which is incomplete and/or incorrect.

In view of the shortcomings in the art, it would be advantageous to provide a method and apparatus which allows for accurate and effective detection of acoustic waves in a downhole environment, and which eliminates the need for mechanical coupling with a fixed structure thereof. It would further be advantageous if such a method and apparatus were compatible with conventional seismic surveying techniques and processes.

BRIEF SUMMARY OF THE INVENTION

In accordance with one aspect of the present invention, a method of detecting seismic waves within subterranean formation is provided. The method includes forming a well bore in the subterranean formation and disposing and securing a casing within the well bore such that seismic waves present in the subterranean formation are transmitted to the casing. A first magnetic field is induced in a first portion of the casing such as by disposing a permanent or electromagnet adjacent the casing. A change in the first magnetic field, such as that caused by a displacement of the casing responsive to one or more seismic waves, is then sensed and a representative signal generated and recorded.

Sensing a change in the magnetic field may be accomplished by disposing an electrical coil within the magnetic field and configuring the coil such that it is displaceable along a defined axis relative to the source magnet. Additional electrical coils may be employed either within the same magnetic field, or within additional magnetic fields. The additional electrical coils are desirably oriented to be displaceable along defined axes which are orthogonal with respect to each other and with respect to the defined axis of the first electrical coil.

In accordance with another aspect of the present invention, an apparatus for detecting seismic waves is provided. The apparatus includes a body which is configured to be deployed within a well bore. A first source magnet may be coupled with the body and configured to induce a first magnetic field within a casing of the well bore. A first electrical coil is positioned within the magnetic field and is configured to detect a change in the first magnetic field. The first electrical coil may also be configured to be displaceable along a first defined axis independent of the first source magnet.

The apparatus may include additional source magnets and/or electrical coils with the electrical coils being oriented substantially orthogonally relative to each other. The apparatus may further include a telemetry device so as to transmit a signal produce by each electrical coil to a control station having a recording device associated therewith. The apparatus may include additional features such as, for example, spacers formed on an outer surface of the body, wherein the spacers are sized, located and configured to prevent contact between the source magnet and the casing of the well bore.

In accordance with another aspect of the present invention, a system for surveying a subterranean formation is provided. The system includes a seismic energy source which is configured to induce seismic waves in the subterranean formation. A well bore is formed within the subterranean formation and a casing is disposed within the well bore. At least one sensing apparatus is deployed within the well bore for detecting seismic waves.

The at least one sensing apparatus includes a body which is configured to be deployed within a well bore. A first source magnet is coupled with the body and configured to induce a first magnetic field within a casing of the well bore. A first electrical coil is positioned adjacent the first source magnet and is configured to detect a change in the first magnetic field. The first electrical coil is also configured to be displaceable along a first defined axis independent of the first source magnet.

The at least one sensing apparatus may include additional source magnets and/or electrical coils with the electrical coils being oriented substantially orthogonally relative to each other. A telemetry device may be employed in association with the at least one sensing apparatus to transmit a signal produce by each electrical coil to a control station having a recording device associated therewith. The apparatus may include additional features such as, for example, spacers formed on an outer surface of the body, wherein the spacers are sized, located and configured to prevent contact between the source magnet and the casing of the well bore.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
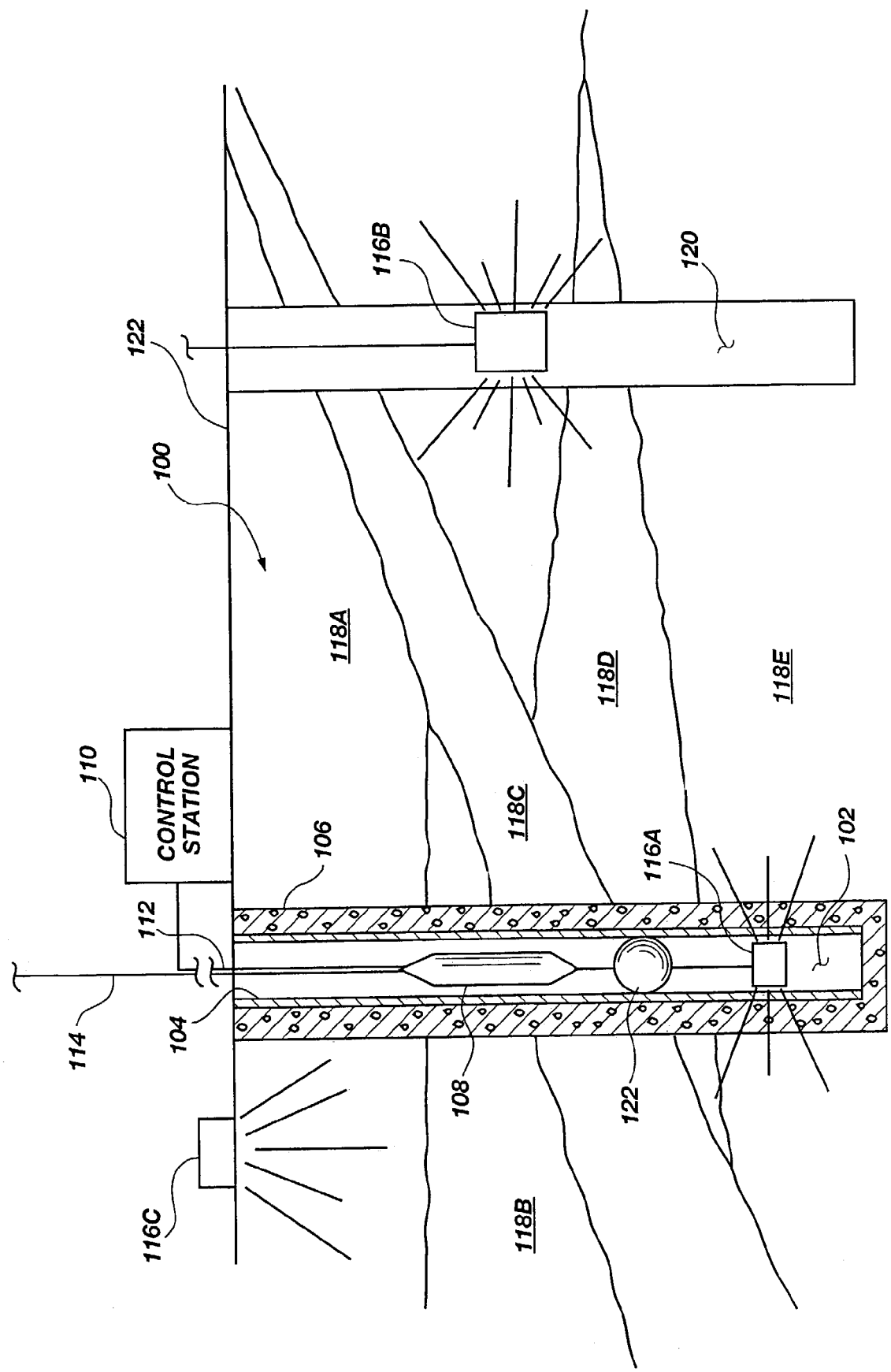
FIG. 1 is a sectional view of a subterranean formation surveying system according to an embodiment of the present invention.

Referring to FIG. 1, a subterranean formation 100 is generally depicted having a first well bore 102 formed therein. The first well bore 102 includes a casing 104 or lining which may be fixed within the subterranean formation 100, for example, by cementing within an annulus 106 formed thereabout as known to those of ordinary skill in the art. The casing 104 should be formed of a material having magnetic properties such as an iron-based, or ferromagnetic, alloy.

A sensing apparatus 108, in accordance with the present invention, is deployed within the well bore 102 at a specified elevation for detecting and recording seismic waves transmitted through the subterranean formation 100 and through the cement in the annulus 106 to the casing 104. It is noted that, while only one sensing apparatus 106 is shown, others may also be deployed at different elevations within the well bore 102 in conjunction with surveying the subterranean formation 100.

The sensing apparatus 108, which shall be described in greater detail below herein, may be coupled with a control station 110 at the surface through an appropriate transmission line 112 such as, for example, a seven conductor wireline known to those of ordinary skill in the art, or a fiber optic line. The control station 110 may include, for example, a power supply to provide power to the sensing apparatus 108 and a computer for collecting and recording signals produced by the sensing apparatus 108. The transmission line 112 may also run adjacent to, or otherwise incorporated with, a tubing string 114, such as coiled tubing, or a cable or other elongated structural member used to support the deployed sensing apparatus 108, as well as other downhole components at a specified elevation within the well bore 102.

The sensing apparatus 108 is configured to detect a seismic wave transmitted through the subterranean formation 100 and to produce an electrical signal representative thereof. The seismic waves may be produced by any of a number of seismic sources known in the art including, for example, vibrational, explosive or acoustic energy sources. Additionally, the seismic source may be positioned in various locations relative to the well bore 102 and the sensing apparatus 108. For example, a seismic source 116A may be placed within the same well bore 102 as the sensing apparatus 108 itself for single well seismic surveying. In such a case seismic waves are emitted from the seismic source 116A and reflected back from various subformations or strata 118A–118E, or changes in composition, within the subterranean formation 100.

In another example, a seismic source 116B may be placed in a second well bore, known as the source well 120, located a known distance from the first well bore 102. The seismic source 116B induces seismic waves in the subterranean formation 100, which may be reflected or refracted by the subformations or strata 118A–118E and detected by the sensing apparatus 106. While only a single source well 120 is shown in FIG. 1, it is noted that multiple source wells might be used wherein the individual source wells are located at different distances and/or relative azimuth orientations with respect to the well bore having the sensing apparatus deployed therein.

In yet another example, one or more seismic sources 116C may be located at the terrestrial surface 122 of the subterranean formation 100. Again, the seismic source 116C projects seismic energy into the subterranean formation, which may be reflected or refracted by the subformations or strata 118A–118E, and is detected by the sensing apparatus 108.

It is noted that additional components may be deployed within the well bore 102 in conjunction with the sensing apparatus 108. For example, a wave suppressor 122 or attenuator may deployed within the well bore 102 for suppression of tube waves which propagate vertically along the length of the well bore 102 within a fluid medium contained therein. Such tube waves, unless suppressed, may interfere with the sensing of the seismic waves by the sensing apparatus 108. An example of a wave suppressor 122 may include a soft bladder configured to substantially absorb such tube waves prior to the tube waves reaching the sensing apparatus 108, although other suppressors may be utilized.

Figure 2:
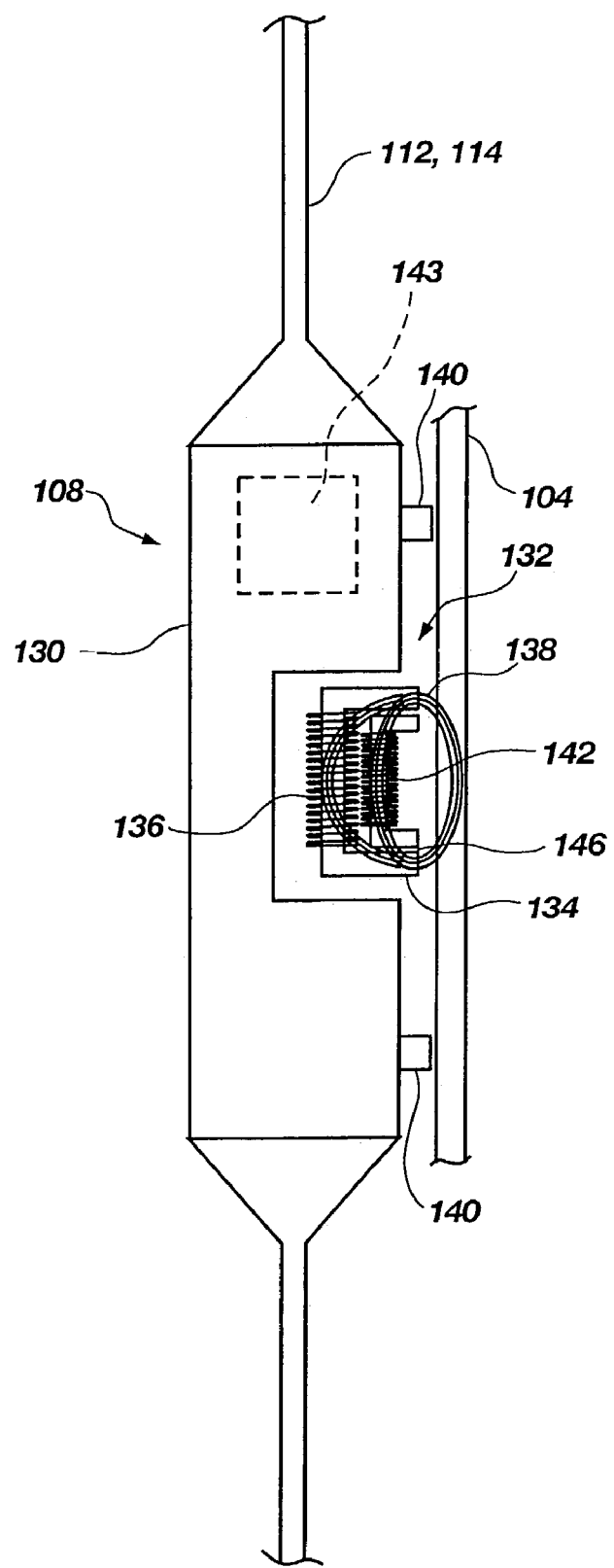
FIG. 2 is a partial cross-sectional view of an apparatus used for detecting seismic waves according to an embodiment of the present invention.

Referring now to FIG. 2, a partial cross-sectional view of the sensing apparatus 108 is shown. The sensing apparatus includes a body 130 sized and configured for deployment within the well bore 102. The body 130 may include an outer housing which is configured to enclose and protect various mechanical and/or electrical components from a fluid which may be present in the well bore 102 (FIG. 1). The sensing apparatus 108 may include multiple sensors, although for purposes of illustration, only a single sensor 132 is shown and described with respect to FIG. 2. The sensor 132, while depicted in cross-sectional view, may also be concealed by or enclosed within the body 130.

The sensor 132 includes a source magnet 134 which may, for example, be an electromagnet formed from a powered coil 136 as shown, or may be a permanent magnet. The source magnet 134 is positioned relative to the casing 104 of the well bore 102 (FIG. 1) so as to induce a magnetic field (as indicated by flux lines 138) within the casing 104. In positioning the source magnet 134, it is desirable to keep the source magnet 134 from contacting the casing 104 so as to not form a closed magnetic circuit. Thus, spacers 140 formed of, for example, a nonferromagnetic material, might be placed on an exterior portion of the body 130 to ensure a minimum spacing between the sensing apparatus 108 and the casing 104. In another embodiment, the housing 132 may be formed of a nonferromagnetic material and the source magnet 134 may be concealed therein so as to avoid direct physical contact with the casing 104 and any potential for interference by well bore fluid with sensor coil 142 movement, as discussed below.

A sensing coil 142 is positioned adjacent the source magnet 134 and, more specifically, within the magnetic field 138 induced thereby. There is no magnetic shielding between the source magnet 134 and the sensing coil 142 as it is desirable for the sensing coil 142 to detect the magnetic field 138 without obstruction. The sensing coil 142 may be coupled to a telemetry device 143 which relays signals generated by the sensing coil 142 back to the control station 110 through appropriate means such as, for example, radio frequency transmissions or via the transmission line 112 (FIG. 1).

In one embodiment, the sensing apparatus 108 is configured to be substantially denser than the fluid in the/well bore 102, which fluid may be a liquid or a gas. By configuring the sensing apparatus 108 to be denser than the fluid in the well bore 102, the sensing apparatus 108 is relatively unaffected by the displacement and movement of the well bore fluid. Thus, while seismic waves may be transmitted through the casing 104 and into the well bore fluid, such waves will not cause congruous displacement and vibration of the sensing apparatus 108. Thus, the sensing apparatus 108 is free to float relative to or, in other words, stays "fixed" relative to the movements of the casing 104 and surrounding well bore fluid.

Figure 3:
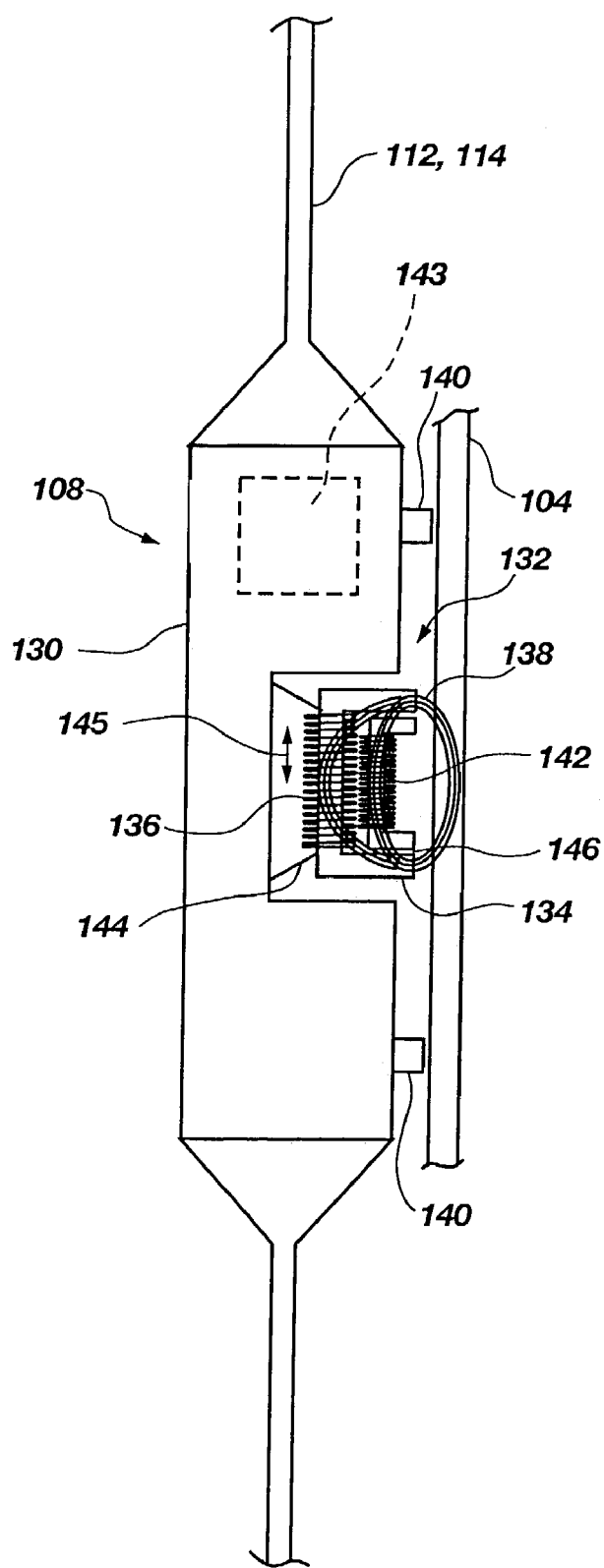
FIG. 3 is partial cross-sectional view of an apparatus used for detecting seismic waves according to another embodiment of the present invention.

Referring briefly to FIG. 3, another embodiment of the sensing apparatus 108' is shown wherein the sensor 132 may be coupled to the body 130 of the sensing apparatus 108 by a restorative force member 144 such as, for example, leaf springs, enabling the sensor 132 to "float," or move relative to the body 130 of the sensing apparatus 108 in a substantially damped manner. Desirably, the restorative force member 144 may exhibit a natural frequency which is lower than the signal frequency (i.e., the frequency of the seismic source 116A–116C) by approximately an order of magnitude. For example, it one embodiment it may be desirable to keep the natural frequency of the restorative force member 144 lower that approximately 14 Hertz (Hz). In using such a restorative force member 144, the sensor 132 is configured such that minute movements or vibrations exhibited by the body 130 of the sensing apparatus 108 do not translate into direct congruous movements or vibrations within the sensor 132 along the defined axis.

In one embodiment, the restorative force members 144 may be configured to act as resilient linkage members to accommodate the directional displacement of the sensor 132, including the source magnet 134 and the sensing coil 142, relative to the body 130. It is noted that, in the embodiment described with respect to FIG. 3, the sensor 132 is configured to float in the substantially vertical direction, as indicated by bidirectional arrow 145, although other directions may be defined.

It is noted that other configurations may be used to enable the sensor 132 to "float" relative to the body 130 and other components of sensing apparatus 108. For example, the sensor 132 may be coupled to the body 130 using linear rod bearings along with biasing members and/or damping members to accomplish independent directional movement of the sensor 132 relative to the body 130.

Figure 4B:
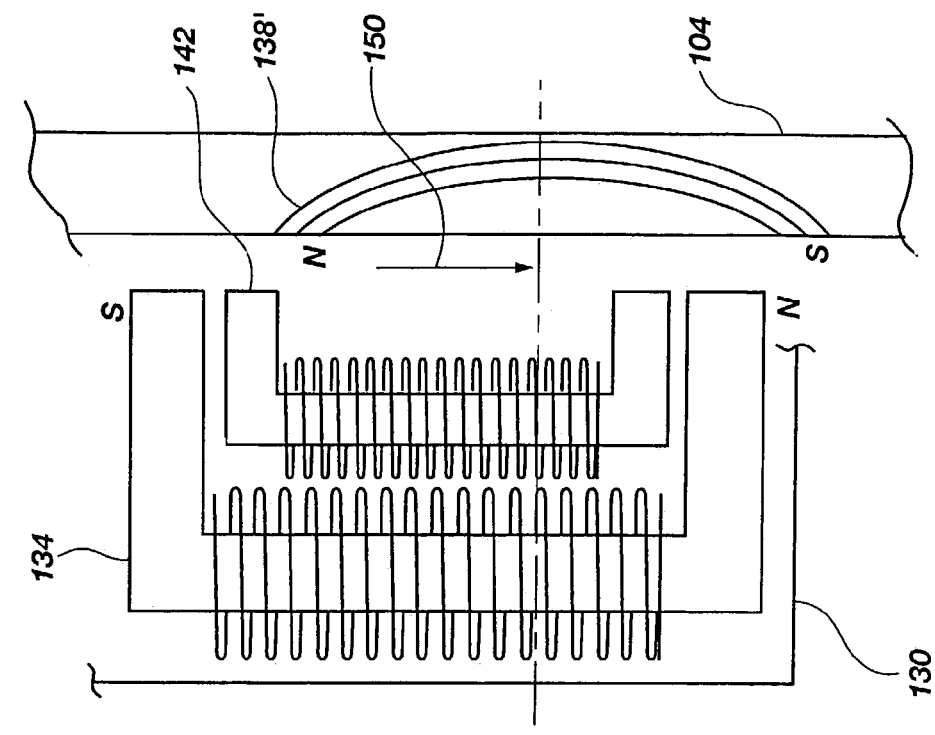
FIGS. 4A and 4B are enlarged views of a portion of the apparatus shown in FIG. 2.
Figure 4A:
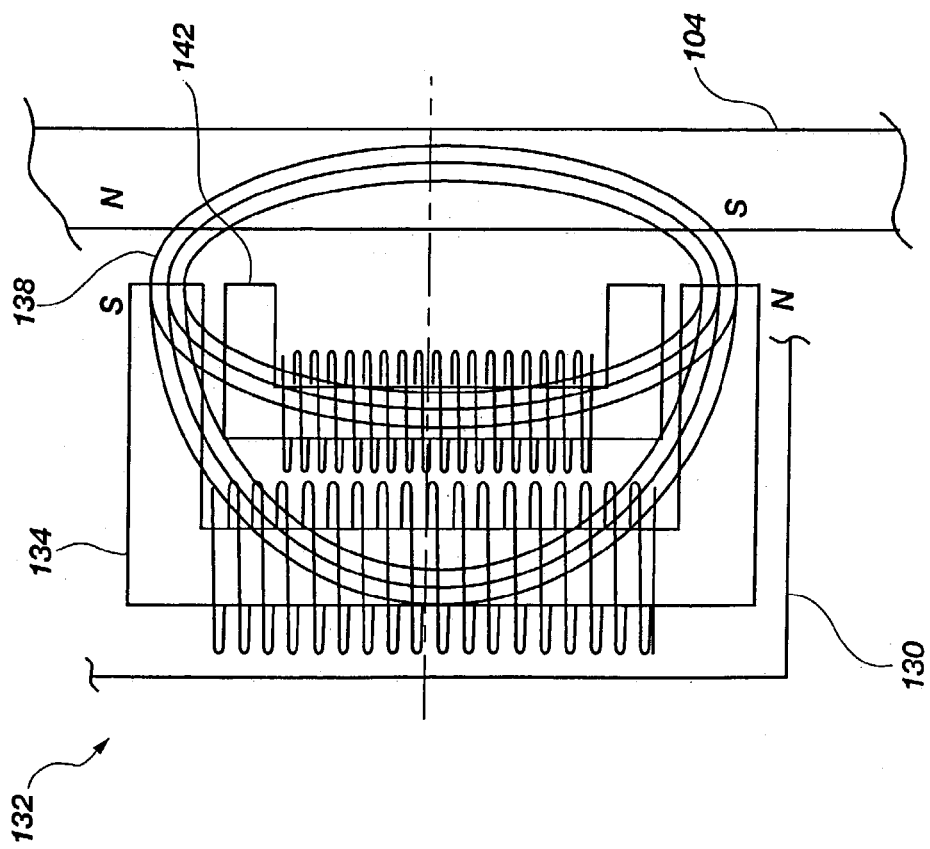

Referring now to FIGS. 4A and 4B, enlarged views of the sensor 132 are shown. In operation, and as noted above, the source magnet 134 induces a magnetic field 138 within the casing 104. When a seismic source 116A–116C projects seismic waves into a subterranean formation 100 (see FIG. 1), the casing 104 vibrates in response to reflection and refraction of the seismic waves by the subterranean formation 100, some of which reflected and refracted waves are transmitted thereto. The casing 104 thus transmits the seismic waves to the sensing apparatus 108 through minute displacements of the casing 104. Due to hysteresis of the material of which the casing 104 is formed, the magnetic field 138 exhibits an "inertia" in that it follows the general pattern of displacement of the casing 104, although lagging somewhat in reference of time.

Thus, for example, referring to FIG. 4A, the casing 104 may start at an initial position thereby defining the magnetic field 138; the sensing coil 142 being positioned within the magnetic field 138. Referring to FIG. 4B, as the casing 104 is displaced in a first direction, as indicated by directional arrow 150, the magnetic field 138', due to the hysteresis in the casing 104, follows the motion of the casing 104. As the casing 104 returns to its original position, and is displaced in the opposite direction, the magnetic field 138, 138' behaves similarly by following the displacement pattern of the casing 104, although in a time-lagging manner as described above.

The change in the magnetic field 138, 138' results in the electromagnetic induction of the sensing coil 142 which sends a signal, in response to the induction, to the control station 110 (FIG. 1) or some other recording device. The signals produced by the sensing coil 142, being representative of the seismic waves transmitted through the subterranean formation 100 (FIG. 1) and through the casing 104, albeit in a time lagging manner as previously described herein, may then be analyzed according to conventional techniques known by those of ordinary skill in the art to determine the composition of the subterranean formation 100 (FIG. 1).

In effect, the present invention combines the sensing apparatus 108 with the casing 104 of a well bore 102 to form a geophone. With the sensing coil 142 acting as the equivalent of the "floating" member of a conventional geophone, the casing 104 becomes analogous to the permanent magnet of a conventional geophone. Thus, while the above-described embodiment of the sensing apparatus 108 discusses the sensor 132 as floating, or being displaceable, relative to the casing 104 and surrounding subterranean formation 100, it is noted that the sensor 132, including the source magnet 134 and sensing coil 142, in effect becomes a substantially stationary reference point within the subterranean formation 100. Thus, seismic waves may be projected through the subterranean formation 100, transmitted through the cement within the annulus 106, into the casing 104 of the well bore 102 and even through fluid contained in the well bore 102 causing minute displacements of each. However, because the sensor 132 floats relative to the casing 104, the well bore fluid contained therein and the surrounding subterranean formation 100, the sensor 132 remains substantially stationary (relative to the subterranean formation 100, well bore 102, etc.) so as to detect the minute displacements of the casing 104 as represented by the change in the magnetic field 138, 138' induced within the casing 104.

Figure 5A:
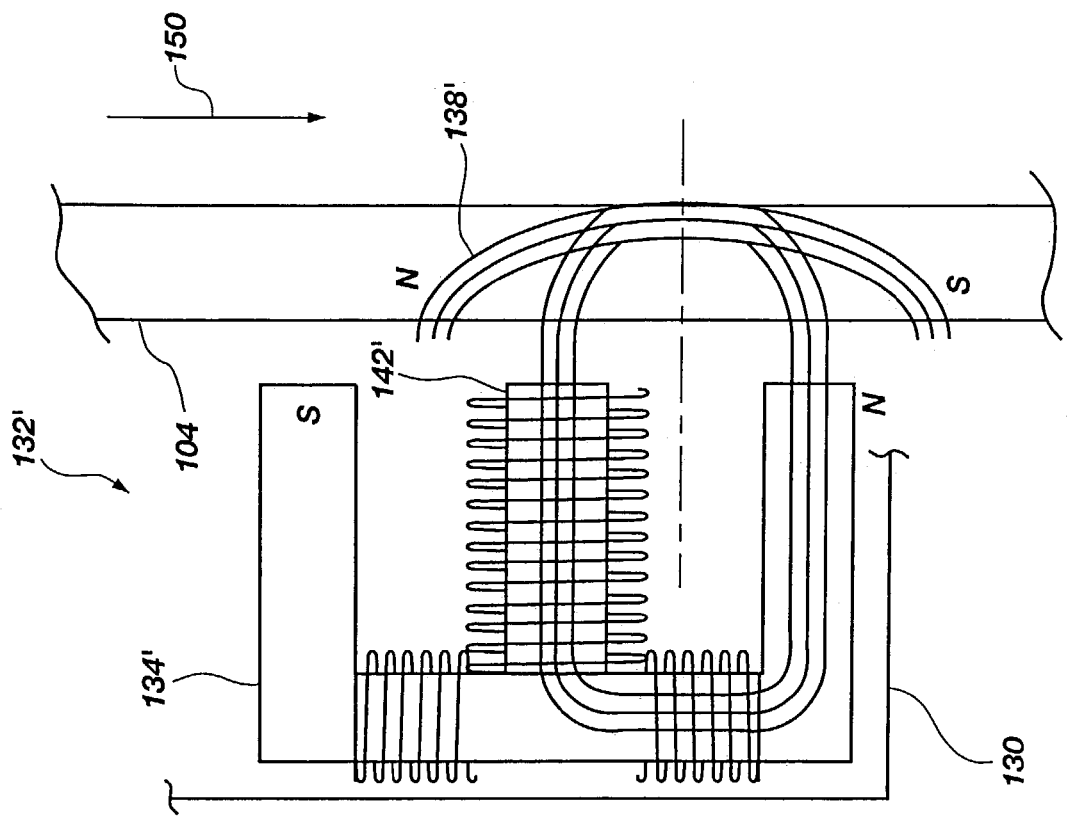
FIGS. 5A and 5B are partial cross-sectional views of a portion of a sensing apparatus according to another embodiment of the present invention.
Figure 5B:
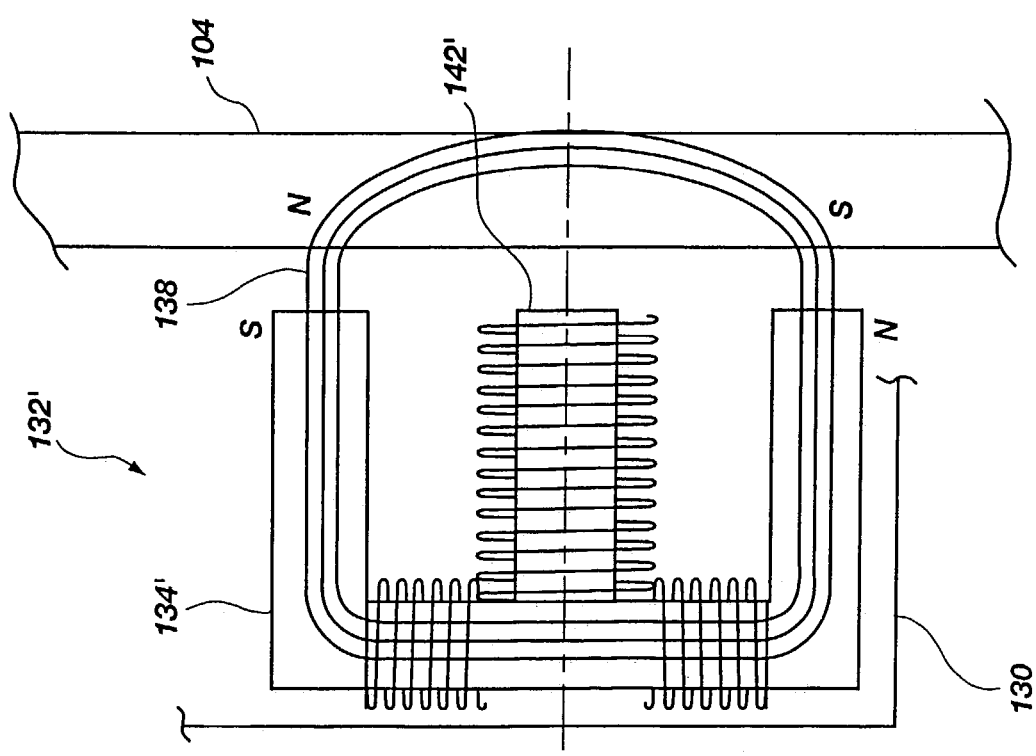

Referring briefly to FIGS. 5A and 5B, another embodiment of the sensor 132' is shown. The sensor 132' again includes a source magnet 134' to induce a magnetic field 138 into the adjacent casing 104 of a well bore 102 (FIG. 1). The sensor 132' also includes a sensing coil 142' for detecting a change in the magnetic field 138. The sensor 132' is configured as an E-core sensor with the sensing coil 142' being oriented substantially perpendicular to the sensing coil 142 shown and described with respect to FIGS. 4A and 4B. The orientation of the sensing coil 142' in the E-core type sensor 132' may be desirable in some situations in regards to detecting a change in the magnetic flux 138 and processing the associated electrical signals produced by such a change in magnetic flux 138. As indicated in FIG. 5B, a downward shift in the casing 104, as again indicated by directional arrow 150, ultimately results in a change in the magnetic flux 138' which will be detected by the sensing coil 142' and processed as an electrical signal for recordation and analysis.

Figure 6B:
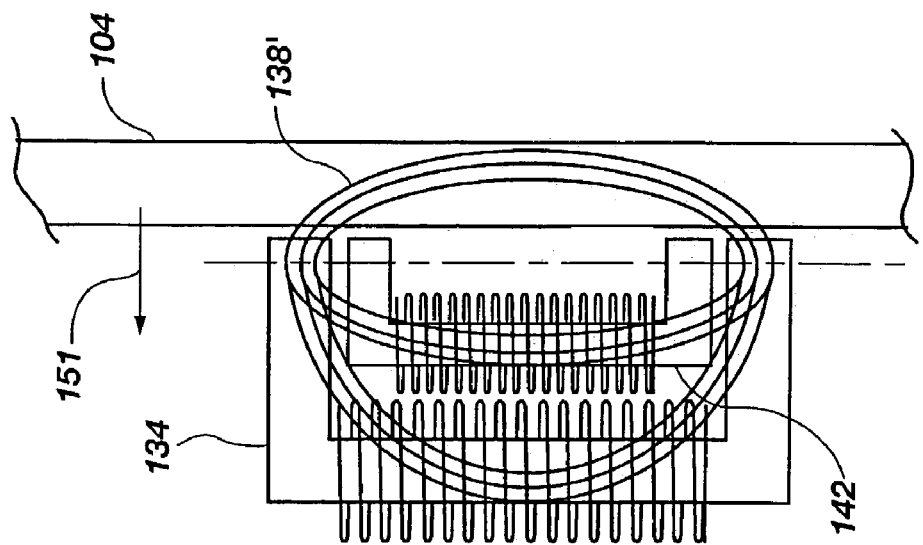
FIGS. 6A and 6B are partial cross-sectional views of a portion of a sensing apparatus according to yet another embodiment of the present invention.
Figure 6A:
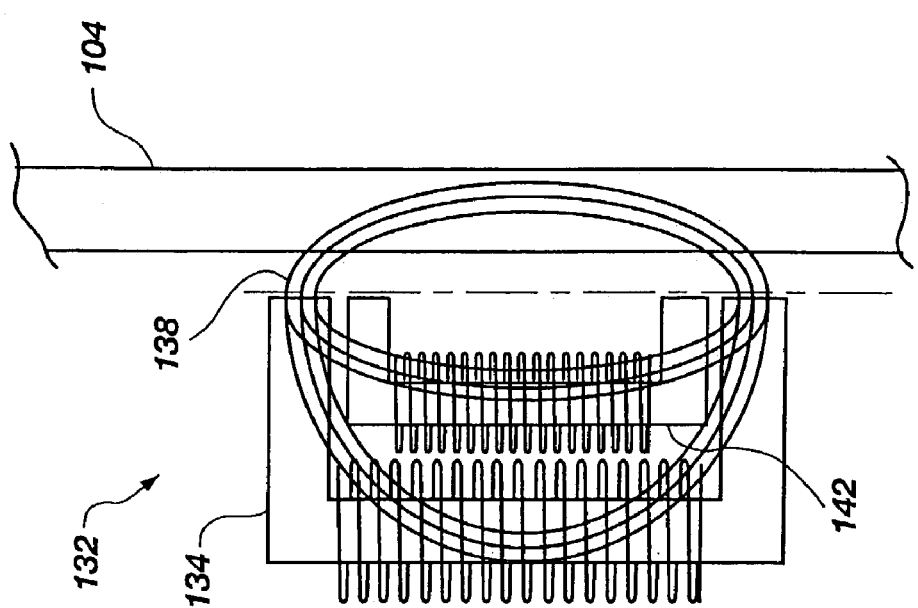

Referring now to FIGS. 6A and 6B, the sensor 132 may be oriented to detect seismic waves which are transmitted along a different plane than those shown and described with respect to FIGS. 5A, 5B, 6A and 6B. For example, the casing 104 may exhibit displacement in a generally horizontal direction as indicated by directional arrow 151 in FIG. 6B. Thus, as the casing is displaced from the position shown in FIG. 6A to that shown in FIG. 6B along the direction indicated by directional arrow 151, the associated magnetic flux 138 will be similarly displaced (see magnetic flux 138" in FIG. 6B) resulting in an inductance of the sensing coil 142. As with previously described embodiments, the sensing coil 142 generates an electrical signal based on the change in magnetic flux 138, 138" representative thereof.

Figure 7:
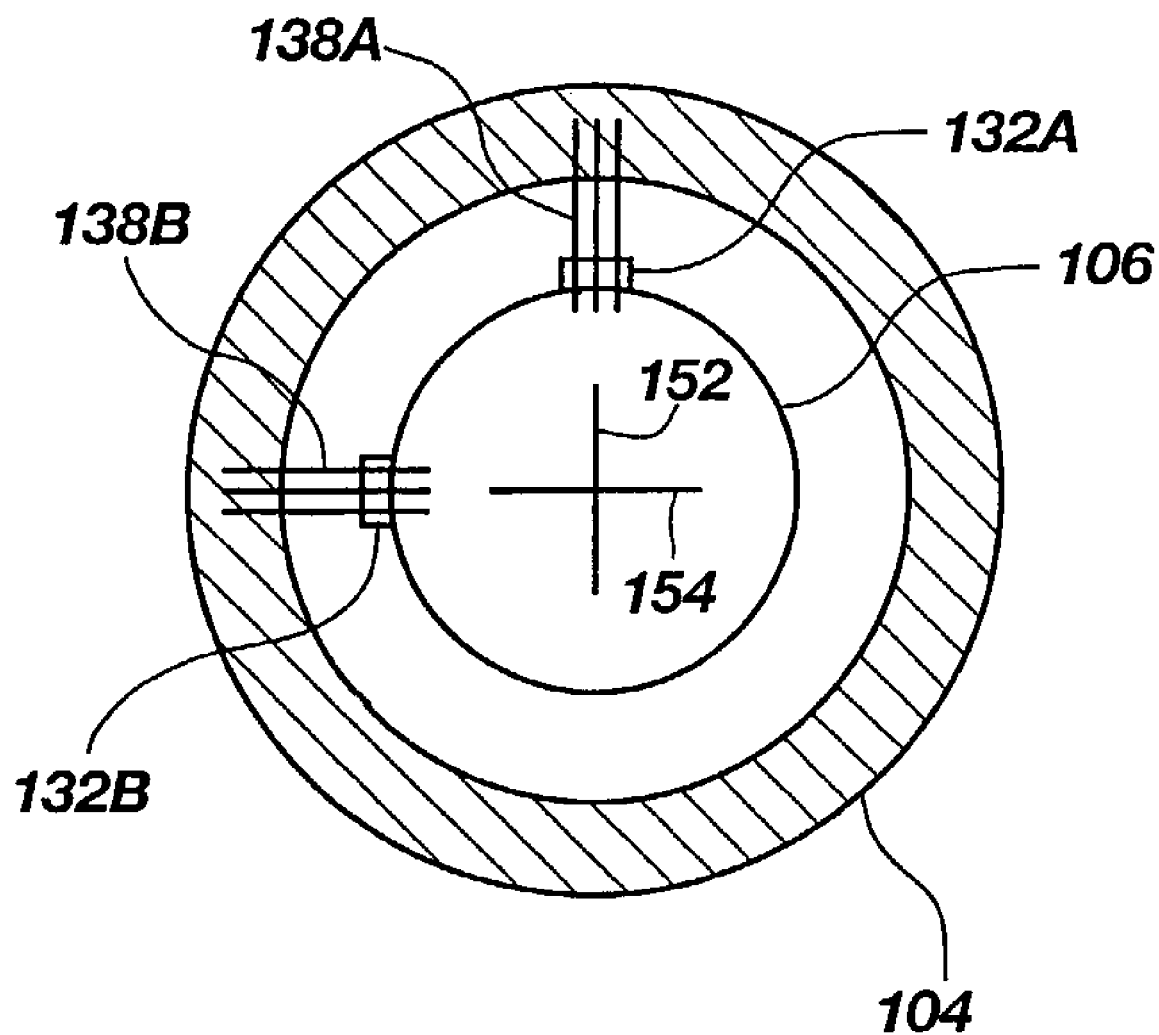
FIG. 7 is a schematic top view of an apparatus for detecting seismic waves according to an embodiment of the present invention.

Referring now to FIG. 7, a top view schematic of the sensing apparatus 108 is shown. As mentioned above, the sensing apparatus 108 may include multiple sensors 132A and 132B. As with a conventional geophone, it may be desirable to orient sensors orthogonally relative to one another so as to detect and record the seismic waves in multiple directions. Thus, sensor 132A including its induced magnetic field 138A, may be oriented in a direction along a first axis 152 while the second sensor 132B and its induced magnetic field 138B are oriented in a direction along a second axis 154, the first and second axes 152 and 154 being oriented substantially orthogonal relative to one another. A third sensor (not shown), may also be incorporated and orthogonally oriented relative to both the first and second sensors 132A and 132B.

It is noted that the above described embodiments have generally discussed the sensing coils 142 as being disposed in separate associated magnetic fields 138. However, in another embodiment of the present invention, multiple sensing coils 142 may be deployed within a single magnetic field 138. Thus, there is considerable flexibility in arranging the sensing coils 142 with respect to the magnetic fields 138.

It is noted that, while the above-described embodiments are discussed in terms of each sensor 132 including a source magnet 134 and a sensing coil 142, that in another embodiment the sensor 132 may not require the source magnet 134. In such a case, the sensing coil 142 may be coupled to the body 130 so as to directionally float relative to its surroundings as generally described above with respect to the sensor 132. Such an embodiment may be desirable in situations where the casing 104 is formed of a magnetic material, or otherwise includes a magnet formed within the casing 104, such that a magnetic field is already present within the casing 104. Of course a sensor 132 which does not require a source magnet 134 generally allows for the construction of a sensing apparatus 108 which is smaller, lighter and less expensive.

Thus, the sensing apparatus 108 of the present invention may be combined with the fixed casing 104 of a well bore 102 to form an effective geophone module which does not need physical clamping to any fixed structure within the well bore 104 thereby eliminating the need for clamping mechanisms with their associated controls and deployment mechanisms. Further, it is noted that the magnetic field or fields 138 may penetrate a built-up layer of mud or other material formed on the casing 104 and that such built up material need not be cleaned off in order to accurately and effectively detect seismic waves transmitted from the adjacent subterranean formation 100.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of detecting seismic waves within a subterranean formation, the method comprising:

forming a well bore in the subterranean formation;
disposing a casing within the well bore;
induced a displacement of the casing corresponding to a seismic wave in the subterranean formation;
providing a first magnetic field within a first portion of the casing; and
sensing a change in the first magnetic field caused by the displacement of the first portion of the casing.

2. The method according to claim 1, further comprising producing an electrical signal representative of the sensed change in the magnetic field.

3. The method according to claim 2, further comprising recording the electrical signal.

4. The method according to claim 1, wherein providing a first magnetic field includes positioning a first source magnet adjacent the first portion of the casing a spaced distance therefrom.

5. The method according to claim 4, wherein positioning a first source magnet includes positioning a permanent magnet adjacent the first portion of the casing.

6. The method according to claim 4, wherein positioning a first source magnet includes positioning an electromagnet adjacent the first portion of the casing.

7. The method according to claim 1, wherein providing a first magnetic field includes forming at least the first portion of the casing from a magnetic material.

8. The method according to claim 1, wherein sensing a change in the first magnetic field further includes disposing a first electrical coil within the first magnetic field and configuring the first electrical coil such that the first electrical coil remains substantially stationary along a first defined axis relative to the first portion of the casing when a displacement of the first portion of the casing occurs.

9. The method according to claim 8, further comprising providing at least a second magnetic field in at least a second portion of the casing and sensing a change in the at least a second magnetic field caused by a displacement of the casing.

10. The method according to claim 9, wherein providing at least a second magnetic field includes providing at least a second source magnet adjacent the at least a second portion of the casing a spaced distance therefrom.

11. The method according to claim 9, wherein sensing a change in the at least a second magnetic field further includes disposing a second electrical coil within the at least a second magnetic field and configuring the at least a second electrical coil such that the second electrical coil remains substantially stationary along an at least second defined axis relative to the at least a second portion of the casing when a displacement of the at least a second portion of the casing occurs.

12. The method according to claim 11, further comprising orienting the first defined axis and the second defined axis substantially orthogonal with respect to each other.

13. The method according to claim 1, wherein sensing a change in the first magnetic field includes sensing a change of the first magnetic field along a plurality of defined axes.

14. An apparatus for detecting seismic waves comprising:
a body configured to be deployed within a well bore;
a first source magnet coupled to the body and configured to develop a first magnetic field within a casing of the well bore;
a first electrical coil coupled with the body, wherein the first electrical coil is configured to detect a change in the first magnetic field while the first electrical coil remains substantially stationary relative to the well bore.

15. The apparatus of claim 14, wherein the apparatus is configured to be denser than a fluid present in the well bore.

16. The apparatus of claim 14, wherein the body is relatively displaceable with respect to the first electrical coil along a first defined axis and wherein the first electrical coil is configured to be disposed within a first magnetic field formed within a casing of a well bore and detect a change within the first magnetic field along a first defined axis.

17. The apparatus of claim 14, further comprising at least a second electrical coil coupled with the body wherein the first electrical coil is oriented along a first defined axis and wherein the at least a second electrical coil is oriented along at least a second defined axis.

18. The apparatus of claim 17, wherein the first defined axis and the at least a second defined axis are substantially orthogonal with respect to each other.

19. The apparatus of claim 17, further comprising at least a second source magnet coupled with the body in association with the at least a second electrical coil and configured to develop at least a second magnetic field within the casing, wherein the at least a second electrical coil is configured to detect a change in the at least a second magnetic field.

20. The apparatus of claim 14, further comprising at least one spacer disposed on a surface of the body, wherein the at least one spacer is sized and configured to prevent the first source magnet from contacting a casing of a well bore.

21. The apparatus of claim 14, wherein the first source magnet is a permanent magnet.

22. The apparatus of claim 14, wherein the first source magnet is an electromagnet.

23. The apparatus of claim 14, further comprising a telemetry device configured to relay a signal from the first electrical coil to a recording device.

24. The apparatus of claim 23, further comprising a transmission line coupled with the telemetry device and configured to be coupled with a recording device.

25. The apparatus of claim 24, wherein the transmission line includes a seven conductor wireline.

26. The apparatus of claim 24, wherein the transmission line includes a fiber optic cable.

27. A system for surveying a subterranean formation comprising:
a seismic energy source configured to induce seismic waves in the subterranean formation;
a well bore formed within the subterranean formation, the well bore having a casing fixed therein;
at least one sensing apparatus deployed within the well bore, the at least one sensing apparatus including:
a body having a longitudinal axis, the body configured to be deployed within a well bore;
a source coil coupled with the body, the source coil configured to induce at least one magnetic field in a casing of the well bore; and
a first electrical coil coupled with the body wherein the first electrical coil is configured to detect a change in at least one magnetic field present in a casing of the well bore, and wherein the source coil and the first electrical coil are positioned radially and longitudinally proximate to each other with respect to the longitudinal axis of the body thereby allowing the first electrical coil to be positioned within at least one magnetic field induced by the source coil.

28. The system of claim 27, wherein the sensing apparatus is configured to be denser than a fluid present in the well bore.

29. The system of claim 27, wherein the body of the sensing apparatus is relatively displaceable with respect to the first electrical coil along a first defined axis and wherein the first electrical coil is configured to be disposed within a first magnetic field formed within the casing of the well bore and detect a change within the first magnetic field along the first defined axis.

30. The system of claim 27, wherein the sensing apparatus further comprises at least a second electrical coil coupled with the body wherein the first electrical coil is configured to detect a change in a magnetic field present in a casing of the well bore along a first defined axis and wherein the at least a second electrical coil is configured to detect a change in a magnetic field present in the casing of the well bore along at least a second defined axis.

31. The system of claim 30, wherein the first defined axis and the at least a second defined axis are substantially orthogonal with respect to each other.

32. The system of claim 27, wherein the casing is formed of a ferromagnetic alloy.

33. The system of claim 27, wherein the casing comprises a magnet.

34. The system of claim 27, wherein the seismic source is deployed within the well bore.

35. The system of claim 27, wherein the seismic source is deployed in a second well bore.

36. The system of claim 27, wherein the seismic source is located at a terrestrial surface of the subterranean formation.

37. The system of claim 27, further comprising a wave attenuator positioned within the well bore.

* * * * *